United States Patent [19]

Oda et al.

[11] Patent Number: 4,692,420

[45] Date of Patent: Sep. 8, 1987

[54] SILICON NITRIDE SINTERED BODY AND MANUFACTURING METHOD THEREOF

[75] Inventors: Isao Oda; Takao Soma, both of Nagoya, Japan

[73] Assignee: NGK Insulators, Ltd., Japan

[21] Appl. No.: 892,362

[22] Filed: Aug. 4, 1986

[30] Foreign Application Priority Data

Sep. 17, 1985 [JP] Japan ................................ 60-204985

[51] Int. Cl.⁴ ............................................. C04B 35/58
[52] U.S. Cl. ......................................... 501/97; 264/65; 264/125; 501/98; 501/118; 501/123; 501/127; 501/152; 501/153
[58] Field of Search .................... 501/97, 98, 118, 123, 501/127, 152, 153; 264/65, 125

[56] References Cited

U.S. PATENT DOCUMENTS

| | | | |
|---|---|---|---|
| 4,134,947 | 1/1979 | Oda et al. | 501/97 |
| 4,218,257 | 8/1980 | Oda et al. | 501/97 |
| 4,376,742 | 3/1983 | Mah | 501/97 |
| 4,535,063 | 8/1985 | Matsuhiro et al. | 501/97 |
| 4,609,633 | 9/1986 | Fukuhara et al. | 501/97 |

Primary Examiner—Stephen J. Lechert, Jr.
Attorney, Agent, or Firm—Parkhurst & Oliff

[57] ABSTRACT

A silicon nitride sintered body essentially consisting of compounds of Mg, Sr, Ce and Al in amounts of from 0.5 to 5% by weight when calculated as MgO, from 0.5 to 5% by weight when calculated as SrO, from 1 to 10% by weight when calculated as $CeO_2$ and from 1 to 20% by weight when calculated as $Al_2O_3$, respectively, and the balance being silicon nitride. A method of manufacturing the silicon nitride sintered body is also disclosed. The silicon nitride sintered body has a low thermal conductivity while high mechanical strength and high thermal shock resistance being maintained.

6 Claims, No Drawings

SILICON NITRIDE SINTERED BODY AND MANUFACTURING METHOD THEREOF

BACKGROUND OF THE INVENTION

1. Field of the Invention

The present invention relates to a silicon nitride sintered body which is high in mechanical strength and thermal shock resistance and low in thermal conductivity and a method of manufacturing the same.

2. Related Art Statement

Since the silicon nitride sintered body is excellent in the mechanical strength, fracture toughness, thermal resistance, thermal shock resistance, etc., its uses as the thermal resistive high strength materials have been actively being developed.

Since silicon nitride is a substance having a strong covalent bonding property and has extremely poor sinterability itself, it is known that a sintering aid such as MgO, $Al_2O_3$, $Y_2O_3$, $ZrO_2$ or the like is generally added to obtain high density sintered bodies. Among them, as the sintered bodies being high in mechanical strength and thermal shock resistance, there are known from Japanese patent publication No. sho 55-46,997 silicon nitride sintered bodies containing BeO, MgO, SrO and oxides of rare earth elements.

However, although the above-mentioned silicon nitride sintered bodies possess high mechanical strength and large thermal shock resistance, they have a drawback that the heat conductivity thereof is too high, for instance, when they are used as engine parts necessitating the heat insulation. That is, the thermal conductivity of the above-mentioned silicon nitride sintered bodies is unfavorably about 0.07 (cal/cm.sec.°C.), which is too high for the application to parts such as engine parts requiring the heat insulating property.

SUMMARY OF THE INVENTION

It is an object of the present invention to overcome the above-mentioned defects, and is to provide a silicon nitride sintered body which maintains high mechanical strength and high thermal shock resistance and is low in thermal conductivity.

Another object of the present invention is to provide a method of manufacturing such a silicon nitride sintered body.

According to the present invention, there is a provision of a silicon nitride sintered body which essentially consists of compounds of Mg, Ar, Ce and Al in amounts of from 0.5 to 5% by weight when calculated as MgO, from 0.5 to 5% by weight when calculated as SrO, from 1 to 10% by weight when calculated as $CeO_2$ and from 1 to 20% by weight when calculated as $Al_2O_3$, respectively, and the balance being silicon nitride.

According to another aspect of the present invention, there is a provision of a method of manufacturing a silicon nitride sintered body, which comprises steps of preparing and molding a formulated raw material essentially consisting of compounds of Mg, Sr, Ce and Al in amounts of from 0.5 to 5% by weight when calculated as MgO, from 0.5 to 5% by weight when calculated as SrO, from 1 to 10% by weight when calculated as $CeO_2$ and from 1 to 20% by weight when calculated as $Al_2O_3$, respectively, and the balance being a silicon nitride raw material powder, and then firing a resulting molding in a nitrogen atmosphere or an inert gas atmosphere.

It is preferable that the silicon nitride powder used as the raw material contains not less than 30% by weight of $\alpha$-phase, and has such a purity as contains not more than 1% of metallic impurities and the average particle size of not more than 10 $\mu$m.

Further, it is also preferable that the silicon nitride in the resulting sintered body contains not less than 90% by weight of $\beta$-phase.

Moreover, it is preferable that the firing conditions are a temperature of from 1,600° C. to 1,900° C. and a time of from 0.2 to 5 hours.

The present invention is based on the discovery that when the silicon nitride sintered body is constituted as mentioned above in which the compound of Al in an amount of from 1 to 20% by weight when calculated as $Al_2O_3$ is included into a silicon nitride sintered body having high mechanical strength as well as high thermal shock resistance, Al solves into $\beta$-$Si_3N_4$ particles or grain boundary phase thereof, whereby the thermal conductivity can be arbitrarily reduced down to about one fifth of that of the conventional articles, while mechanical strength and thermal shock resistance being maintained.

These and other objects, features and advantages of the invention will be well appreciated upon reading of the following description of the invention with understanding that some modifications, variations and changes of the same could be made by a skilled person in the art to which the invention pertains without departing from the spirit of the invention or the scope of claims appended hereto.

DETAILED DESCRIPTION OF THE INVENTION

The present invention will be explained in more detail below.

It is known that there are two crystalline structures of $\alpha$-phase and $\beta$-phase in silicon nitride. When silicon nitride is heated at a temperature of not less than 1,400° C., $\alpha$-phase begins to transform to $\beta$-phase. When a temperature becomes not less than 1,600° C., the transfer speed increases. On the other hand, when SrO and MgO are heated at a temperature of 1,600° C. or higher, they form SrO-MgO-$SiO_2$ base crystals or liquid phase through reaction with $SiO_2$ present in a very small amount in $Si_2N_4$. Since these reactions take place simultaneously with the transformation of the $\alpha$-phase to the $\beta$-phase, the densification is promoted and at the same time particles of $Si_3N_4$ are firmly bonded together.

When $CeO_2$ is present together with SrO, MgO, etc., $CeO_2$ is uniformly distributed in interfaces of the $Si_3N_4$ particles and bonds with SrO, MgO and $SiO_2$ to form a liquid phase or crystals having high melting points. Thus, $CeO_2$ has an excellent effect of densification of the silicon nitride. The resulting silicon nitride sintered body is composed of very fine and uniform particles, which are considered to largely contribute to the densification and the strengthening of the silicon nitride sintered body according to the present invention.

It is preferably necessary that the silicon nitride powdery raw material used in the present invention contains not less than 30% by weight of $\alpha$-phase. The reason therefor is that the transformation from the $\alpha$-phase to the $\beta$-phase of silicon nitride participates in the sintering as mentioned before. In order to fully promoto the sintering, it is desirable that $\alpha$-phase is contained in an amount of not less than 30%. As to the impurities in the silicon nitride powder, it is desirable that the silicon nitride powder contains not more than 1% of metallic impurities. Because impure components evaporate during firing at high temperatures to cause pores or to react with additives to form a liquid phase of a low melting point and extremely deteriorate high temperature properties of the sintered body. Further, since silicon nitride is poor in sinterability, it is necessary that the particle size of the raw material is made fine and the surface tension of the raw material powder is made larger. It is favorable to use fine particles of not more than 10 microns.

As the amount of additive components becomes larger, densification proceeds, but excess additive components form large amount of different phase between the silicon nitride particles to unfavorably extremely damage properties as high temperature material. Further, if the compounds of Mg, Sr, and Ce are less than 0.5% by weight when calculated as MgO, less than 0.5% by weight when calculated as SrO and less than 1% by weight when calculated as $CeO_2$, respectively, the densification is insufficient and mechanical strength is low. Therefore, the addition amounts of Mg, Sr and Ce are restricted to from 0.5 to 5% by weight when calculated as MgO, from 0.5 to 5% by weight when calculated as SrO, and from 1 to 10% by weight when calculated as $CeO_2$, respectively. If the compound of Al is added in an amount of less than 1% by weight when calculated as $Al_2O_3$, the reduction in the thermal conductivity is not observed, while if it is more than 20% by weight, the mechanical strength is lowered. Thus, the compound of Al is restricted to from 1 to 20% by weight when calculated as $Al_2O_3$.

The silicon nitride sintered body according to the present invention may be produced by the following method.

That is, a formulated raw material is prepared from a raw material powder comprising compounds of Mg, Sr, Ce and Al as sintering aids in amounts of from 0.5 to 5% by weight when calculated as MgO, from 0.5 to 5% by weight when calculated as SrO, from 1 to 10% by weight when calculated as $CeO_2$, and from 1 to 20% by weight when calculated as $Al_2O_3$, respectively, and the balance being silicon nitride. In this case, as a mill, use may be made of a rotary mill, a vibration mill, an attrition mill, etc. Either one of a wet type milling and a dry type milling may do and a formulated powder amount, an amount of media, a liquid medium, a viscosity of a slurry, etc. may be appropriately selected depending upon a milling system. As the liquid medium, use may be made of acetone, alcohol, water, etc. A milling time depends upon the milling system and volume, and is set at a time during which a milled powder is made fine and the average particle size and the BET specific surface area are saturated up to constant limit values. The average particle size is preferably not more than 10 $\mu$m, and the BET specific surface area is preferably from 1 to 50 $m^2/g$.

If necessary, a molding aid such as polyvinyl alcohol is added to the formulated raw material milled up to a desired particle size, and after stirring, the resulting powder or slurry is dried to obtain a powder to be molded. The thus obtained power is molded into a desired profile by means of an isostatic press, etc., which is then fired at a temperature of 1,600°–1,900° C. in a nitrogen atmosphere or an inert gas atmosphere for a time of 0.2~5 hours, preferably 0.5~2 hours, thereby obtaining a silicon nitride sintered body.

Any compounds may be used as the compounds of Sr, Mg, Ce and Al so long as they give oxides or oxynitrides through firing. For instance, use may be made of SrO, $SrCO_2$, $Sr(NO_2)_2.4H_2O$, MgO, $MgCO_3$, $Mg(OH)_2$, $Mg(NO_3)_2.6H_2O$, $CeO_2$, $Ce(NO_3)_3.6H_2O$, $Al_2O_3$, $Al(NO_3)_2.9H_2O$, etc. which have a purity of not less than 98% by weight. When they are added in the form of powder, it is preferable that the average particle size is not more than 5 $\mu$m and the BET specific surface area is 1~5 $m^2/g$. On the other hand, when they are hydrolized and added after being converted to aqueous solutions of nitrates or alkoxide solutions, decomposed volatile components need be removed through calcination.

In the following, examples of the present invention will be explained more in detail. These examples are merely given in the illustration of the invention, but should never be interpreted to limit the scope thereof.

EXAMPLE 1

A sample was formulated at a recipe shown in Table 1 by using a silicon nitride raw material powder having a purity of about 96% by weight, the average particle size of 0.7 $\mu$m, and the BET specific surface area of 8.5 $m^2/g$, sintering aids having purities of from 98 to 99% by weight and the average particle size of 2~0.5 $\mu$m, and $Al_2O_3$. A formulated material was milled by using 7 mm outer diameter media, which had an iron core and a surface coated with a nylon resin to prevent admixing of impurities. Into 200 g of a milled raw material within a nylon resin vessel of an inner volume of 1.2 l, 500 ml of acetone and 500 g of media were added and then the mixture was milled at 100 rpm for 300 hours by means of a rotary mill. After the resulting powder was dried, it was hydrostatically press molded under a pressure of 3 tons/$cm^2$ into 60×60×6 mm. The resulting molding was sintered at 1,700° C. for one hour under atmospheric pressure, thereby obtaining silicon nitride sintered bodies (Nos. 1 to 12) according to the present invention.

Samples, which compositions were outside of the restriction ranges of the present invention, were separately prepared under the same conditions, thereby obtained comparative example sintered bodies (Nos. 13 to 17). Further, prior art samples (Nos. 18–20) were prepared. Comparison among these sintered bodies were performed through measurements with respect to bulk density, thermal conductivity, and strength.

The thermal conductivity was measured according to a laser flash method by using a disc of 10 mm in diameter and 3 thick worked from a sintered body as a sample. As to the strength, a four point bending strength was measured according to JIS R-1601 "Method of testing bending strength of fine ceramics". The bulk density, the thermal conductivity and the strength of the sintered bodies are shown in Table 1.

TABLE 1

| | Sample No. | Formulation rates (wt. %) | | | | | Bulk density (g/cm³) | Thermal conductivity (cal/cm. sec. °C.) | Strength at room temperature (MPa) |
| | | Si₃N₄ | calculated as Al₂O₃ | calculated as SrO | calculated as MgO | calculated as CeO₂ | | | |
|---|---|---|---|---|---|---|---|---|---|
| Present invention | 1 | 93.5 | 1.0 | 1.0 | 2.5 | 2.0 | 3.09 | 0.06 | 617 |
| | 2 | 86 | 2.0 | 2.0 | 5.0 | 5.0 | 3.11 | 0.06 | 676 |
| | 3. | 90.0 | 2.0 | 3.0 | 3.0 | 2.0 | 3.12 | 0.05 | 612 |
| | 4 | 88 | 5.0 | 1.5 | 2.5 | 3.0 | 3.12 | 0.05 | 653 |
| | 5 | 86.5 | 7.0 | 1.4 | 2.3 | 2.8 | 3.10 | 0.05 | 622 |
| | 6 | 82.2 | 7.0 | 1.4 | 4.7 | 4.7 | 3.13 | 0.04 | 631 |
| | 7 | 85.5 | 7.0 | 2.8 | 2.8 | 1.9 | 3.07 | 0.03 | 604 |
| | 8 | 83.0 | 10.0 | 1.5 | 2.5 | 3.0 | 3.09 | 0.03 | 615 |
| | 9 | 78.5 | 10.0 | 1.5 | 5.0 | 5.0 | 3.17 | 0.02 | 594 |
| | 10 | 81.0 | 15.0 | 0.5 | 2.0 | 1.5 | 3.15 | 0.02 | 584 |
| | 11 | 81.0 | 15.0 | 2.0 | 0.5 | 1.5 | 3.14 | 0.01 | 567 |
| | 12 | 76.5 | 20.0 | 0.5 | 2.0 | 1.0 | 3.16 | 0.01 | 554 |
| Comparative example | 13 | 92.9 | 0.1 | 1.5 | 2.5 | 3.0 | 3.07 | 0.07 | 669 |
| | 14 | 96 | 0.5 | 0.5 | 2.0 | 1.0 | 3.02 | 0.07 | 609 |
| | 15 | 71.0 | 22.0 | 1.5 | 2.5 | 3.0 | 3.07 | 0.01 | 490 |
| | 16 | 71.5 | 25.0 | 0.5 | 2.0 | 1.0 | 3.10 | 0.01 | 431 |
| | 17 | 66.7 | 25.0 | 1.1 | 3.4 | 3.8 | 3.13 | 0.01 | 315 |
| Prior art | 18 | 93.0 | — | 1.5 | 2.5 | 3.0 | 3.03 | 0.07 | 691 |
| | 19 | 88.5 | — | 1.5 | 5.0 | 5.0 | 3.19 | 0.07 | 632 |
| | 20 | 96.5 | — | 0.5 | 2.0 | 1.0 | 3.01 | 0.08 | 612 |

TABLE 1(b)

| | Sample No. | Formulation rates (wt. %) | | | | | Bulk density (g/cm³) | Thermal conductivity (cal/cm.sec. °C.) | Strength at room temperature (MPa) |
| | | Si₃N₄ | calculated as Al₂O₃ | calculated as SrO | calculated as MgO | calculated as CeO₂ | | | |
|---|---|---|---|---|---|---|---|---|---|
| Comparative example | 13 | 92.9 | 0.1 | 1.5 | 2.5 | 3.0 | 3.07 | 0.07 | 669 |
| | 14 | 96 | 0.5 | 0.5 | 2.0 | 1.0 | 3.02 | 0.07 | 609 |
| | 15 | 71.0 | 22.0 | 1.5 | 2.5 | 3.0 | 3.07 | 0.01 | 490 |
| | 16 | 71.5 | 25.0 | 0.5 | 2.0 | 1.0 | 3.10 | 0.01 | 431 |
| | 17 | 66.7 | 25.0 | 1.1 | 3.4 | 3.8 | 3.13 | 0.01 | 315 |
| Prior art | 18 | 93.0 | — | 1.5 | 2.5 | 3.0 | 3.03 | 0.07 | 691 |
| | 19 | 88.5 | — | 1.5 | 5.0 | 5.0 | 3.19 | 0.07 | 632 |
| | 20 | 96.5 | — | 0.05 | 2.0 | 1.0 | 3.01 | 0.08 | 612 |

As obvious from the results of Table 1, the silicon nitride sintered body having a low thermal conductivity and a high strength can be obtained by the manufacturing method of silicon nitride sintered body according to the present invention.

As evident from the foregoing description, according to the silicon nitride sintered body and the manufacturing method thereof in the present invention, the silicon nitride sintered body having a low thermal conductivity while high mechanical strength and thermal shock resistance being maintained can be obtained by including an appropriate amount of $Al_2O_3$ into the silicon nitride sintered body having high mechanical strength and high thermal shock resistance.

Consequently, the silicon nitride sintered body according to the present invention can be favorably used, for instance, as the engine parts necessitating the heat insulating property.

What is claimed is:

1. A silicon nitride sintered body consisting essentially of Mg in an amount of from 0.5 to 5% by weight calculated as MgO, Sr in an amount of from 0.5 to 5% by weight calculated as SrO, Ce in an amount of from 1 to 10% by weight calculated as $CeO_2$ and Al in an amount of from 1 to 20% by weight calculated as $Al_2O_3$, the balance being silicon nitride.

2. A silicon nitride sintered body of claim 1, wherein the silicon nitride in the sintered body contains not less than 90% by weight of β-phase.

3. A method for producing a silicon nitride sintered body, which comprises formulating and molding a raw material powder consisting essentially of Mg in an amount of from 0.5 to 5% by weight calculated as MgO, Sr in an amount of from 0.5 to 5% by weight calculated as SrO, Ce in an amount of from 1 to 10% by weight calculated as $CeO_2$ and Al in an amount of from 1 to 20% by weight calculated as $Al_2O_3$, the balance being silicon nitride; and then firing the resulting molding in a nitrogen atmosphere or an inert gas atmosphere.

4. A method according to claim 3, wherein the silicon nitride sintered raw material powder contains not less than 30% by weight of α-phase.

5. A method according to claim 3, wherein the silicon nitride sintered raw material powder has a total content of metallic impurities of not more than 1% by weight, an average particle size of not more than 10 μm, and a BET specific surface area of from 1 to 50 m²/g.

6. A method according to claim 3, wherein the firing occurs at a firing temperature of from 1,600° C. to 1,900° C. for a firing time of from 0.2 to 5 hours.

* * * * *